（12）United States Patent
Suganuma

(10) Patent No.: US 12,512,641 B2
(45) Date of Patent: Dec. 30, 2025

(54) EXTREME ULTRAVIOLET LIGHT GENERATION APPARATUS AND ELECTRONIC DEVICE MANUFACTURING METHOD

(71) Applicant: Gigaphoton Inc., Tochigi (JP)

(72) Inventor: Takashi Suganuma, Oyama (JP)

(73) Assignee: Gigaphoton Inc., Tochigi (JP)

( * ) Notice: Subject to any disclaimer, the term of this patent is extended or adjusted under 35 U.S.C. 154(b) by 388 days.

(21) Appl. No.: 18/186,662

(22) Filed: Mar. 20, 2023

(65) Prior Publication Data

US 2023/0387644 A1 Nov. 30, 2023

(30) Foreign Application Priority Data

May 25, 2022 (JP) ................................ 2022-085523

(51) Int. Cl.
*H01S 3/04* (2006.01)
*H01S 3/00* (2006.01)
(Continued)

(52) U.S. Cl.
CPC .......... *H01S 3/0407* (2013.01); *H01S 3/0014* (2013.01); *H01S 3/0606* (2013.01);
(Continued)

(58) Field of Classification Search
CPC .... H01S 3/0407; H01S 3/0014; H01S 3/0606; H01S 3/11; H01S 3/1305; H01S 3/2341;
(Continued)

(56) References Cited

U.S. PATENT DOCUMENTS 5,269,778 A 12/1993 Rink et al.
6,449,294 B1 * 9/2002 Boutoussov .......... H01S 3/1022
  372/25
(Continued)

FOREIGN PATENT DOCUMENTS

CN 201853935 U * 6/2011
GB 2434559 A * 8/2007 ............. B23K 26/40
(Continued)

OTHER PUBLICATIONS

Search Report mailed by the Netherlands Patent Office on Jul. 11, 2025, which corresponds to Dutch Patent Application No. 2034367, and is related to U.S. Appl. No. 18/186,662; with partial English translation.

*Primary Examiner* — David A Vanore
(74) *Attorney, Agent, or Firm* — Studebaker Brackett PLLC

(57) ABSTRACT

An extreme ultraviolet light generation apparatus includes a first light source outputting first excitation light, a laser oscillator including an active medium and performing laser oscillation by irradiating the active medium with the first excitation light to output the laser light, a measurement instrument measuring a pulse energy and a pulse time width of the laser light, a temperature regulator that adjusts a temperature of a cooling medium that cools the first light source, and a processor. The processor controls the temperature regulator to adjust the temperature of the cooling medium so that the pulse energy measured by the measurement instrument falls within a target range of the pulse energy, and adjust a current value of a current supplied to the first light source so that the pulse time width measured by the measurement instrument falls within a target range of the pulse time width.

12 Claims, 12 Drawing Sheets

(51) Int. Cl.
*H01S 3/06* (2006.01)
*H01S 3/11* (2023.01)
*H01S 3/13* (2006.01)
*H05G 2/00* (2006.01)

(52) U.S. Cl.
CPC .............. *H01S 3/11* (2013.01); *H01S 3/1305* (2013.01); *H05G 2/0084* (2024.08)

(58) Field of Classification Search
CPC ...... H01S 3/061; H01S 3/0941; H01S 3/1317; H01S 3/1643; H01S 3/2232; H01S 3/115; H01S 3/2391; H05G 2/0084
See application file for complete search history.

(56) References Cited

U.S. PATENT DOCUMENTS

| | | | |
|---|---|---|---|
| 6,822,977 B1 | 11/2004 | Stamm et al. | |
| 7,082,145 B2 * | 7/2006 | Palmer | H01S 3/082 372/100 |
| 9,762,024 B2 * | 9/2017 | Kurosawa | H05G 2/0082 |
| 2004/0160155 A1 * | 8/2004 | Partlo | B82Y 10/00 313/231.31 |
| 2006/0006345 A1 * | 1/2006 | Smith | H05G 2/007 250/492.2 |
| 2006/0078017 A1 * | 4/2006 | Endo | G03F 7/70033 372/38.02 |
| 2008/0073598 A1 * | 3/2008 | Moriya | H05G 2/0094 250/504 R |
| 2008/0143989 A1 * | 6/2008 | Brudermann | G03F 7/70041 355/68 |
| 2008/0197298 A1 * | 8/2008 | Abe | H05G 2/009 250/504 R |
| 2009/0314967 A1 * | 12/2009 | Moriya | G21K 1/10 250/504 R |
| 2010/0193710 A1 * | 8/2010 | Wakabayashi | G03F 7/70033 372/20 |
| 2012/0229889 A1 * | 9/2012 | Suganuma | H01S 5/042 359/344 |
| 2013/0032735 A1 * | 2/2013 | Nowak | H01S 3/2316 359/280 |
| 2014/0203194 A1 * | 7/2014 | Nagano | H01S 3/1075 250/494.1 |
| 2014/0319388 A1 * | 10/2014 | Moriya | H01S 3/2316 359/349 |
| 2014/0346375 A1 * | 11/2014 | Nowak | H05G 2/0084 250/504 R |
| 2014/0346376 A1 * | 11/2014 | Nowak | G02F 1/0311 359/245 |
| 2015/0340838 A1 * | 11/2015 | Moriya | H05G 2/0086 250/504 R |
| 2017/0215267 A1 * | 7/2017 | Abe | H05G 2/0084 |
| 2017/0250517 A1 * | 8/2017 | Suzuki | H01L 21/30 |
| 2017/0280545 A1 * | 9/2017 | Tomita | G01J 1/429 |
| 2018/0342849 A1 | 11/2018 | Nogiwa et al. | |
| 2021/0016390 A1 * | 1/2021 | Ashikawa | H01S 3/0401 |
| 2023/0387644 A1 * | 11/2023 | Suganuma | H05G 2/0084 |

FOREIGN PATENT DOCUMENTS

| | | | | |
|---|---|---|---|---|
| JP | H11233867 A | * | 8/1999 | |
| JP | 2004-289066 A | | 10/2004 | |
| JP | 2014212205 | A * | 11/2014 | ............. H01S 3/10 |
| JP | 2016-051897 A | | 4/2016 | |

\* cited by examiner

EXTREME ULTRAVIOLET LIGHT GENERATION APPARATUS AND ELECTRONIC DEVICE MANUFACTURING METHOD

The present application claims the benefit of Japanese Patent Application No. 2022-085523, filed on May 25, 2022, the entire contents of which are hereby incorporated by reference.

BACKGROUND

1. Technical Field

The present disclosure relates to an extreme ultraviolet light generation apparatus and an electronic device manufacturing method.

2. Related Art

Recently, miniaturization of a transfer pattern in optical lithography of a semiconductor process has been rapidly proceeding along with miniaturization of the semiconductor process. In the next generation, microfabrication at 10 nm or less will be required. Therefore, it is expected to develop a semiconductor exposure apparatus that combines an apparatus for generating extreme ultraviolet (EUV) light having a wavelength of about 13 nm with a reduced projection reflection optical system.

As the EUV light generation apparatus, a laser produced plasma (LPP) type apparatus using plasma generated by irradiating a target substance with laser light has been developed.

LIST OF DOCUMENTS

Patent Documents

Patent Document 1: US Patent Application Publication No. 2017/0280545
Patent Document 2: Japanese Patent Application Publication No. 2016-51897
Patent Document 3: Japanese Patent Application Publication No. 2004-289066
Patent Document 4: US Patent Application Publication No. 2008/0143989

SUMMARY

An extreme ultraviolet light generation apparatus, according to an aspect of the present disclosure, configured to generate extreme ultraviolet light by irradiating a droplet target with laser light includes a first light source configured to output first excitation light, a laser oscillator including an active medium and configured to perform laser oscillation by irradiating the active medium with the first excitation light to output the laser light, a measurement instrument configured to measure a pulse energy and a pulse time width of the laser light, a temperature regulator that adjusts a temperature of a cooling medium that cools the first light source, and a processor. Here, the processor is configured to control the temperature regulator to adjust the temperature of the cooling medium so that the pulse energy measured by the measurement instrument falls within a target range of the pulse energy, and adjust a current value of a current supplied to the first light source so that the pulse time width measured by the measurement instrument falls within a target range of the pulse time width.

An electronic device manufacturing method according to another aspect of the present disclosure includes outputting extreme ultraviolet light generated using an extreme ultraviolet light generation apparatus to an exposure apparatus, and exposing a photosensitive substrate to the extreme ultraviolet light in the exposure apparatus to manufacture an electronic device. Here, the extreme ultraviolet light generation apparatus is configured to generate the extreme ultraviolet light by irradiating a droplet target with laser light, and includes a first light source configured to output first excitation light, a laser oscillator including an active medium and configured to perform laser oscillation by irradiating the active medium with the first excitation light to output the laser light, a measurement instrument configured to measure a pulse energy and a pulse time width of the laser light, a temperature regulator that adjusts a temperature of a cooling medium that cools the first light source, and a processor. The processor is configured to control the temperature regulator to adjust the temperature of the cooling medium so that the pulse energy measured by the measurement instrument falls within a target range of the pulse energy, and adjust a current value of a current supplied to the first light source so that the pulse time width measured by the measurement instrument falls within a target range of the pulse time width.

An electronic device manufacturing method according to another aspect of the present disclosure includes inspecting a defect of a mask by irradiating the mask with extreme ultraviolet light generated using an extreme ultraviolet light generation apparatus, selecting a mask using a result of the inspection, and exposing and transferring a pattern formed on the selected mask onto a photosensitive substrate. Here, the extreme ultraviolet light generation apparatus is configured to generate the extreme ultraviolet light by irradiating a droplet target with laser light, and includes a first light source configured to output first excitation light, a laser oscillator including an active medium and configured to perform laser oscillation by irradiating the active medium with the first excitation light to output the laser light, a measurement instrument configured to measure a pulse energy and a pulse time width of the laser light, a temperature regulator that adjusts a temperature of a cooling medium that cools the first light source, and a processor. The processor is configured to control the temperature regulator to adjust the temperature of the cooling medium so that the pulse energy measured by the measurement instrument falls within a target range of the pulse energy, and adjust a current value of a current supplied to the first light source so that the pulse time width measured by the measurement instrument falls within a target range of the pulse time width.

BRIEF DESCRIPTION OF THE DRAWINGS

Embodiments of the present disclosure will be described below merely as examples with reference to the accompanying drawings.

DESCRIPTION OF EMBODIMENTS

Figure 1:
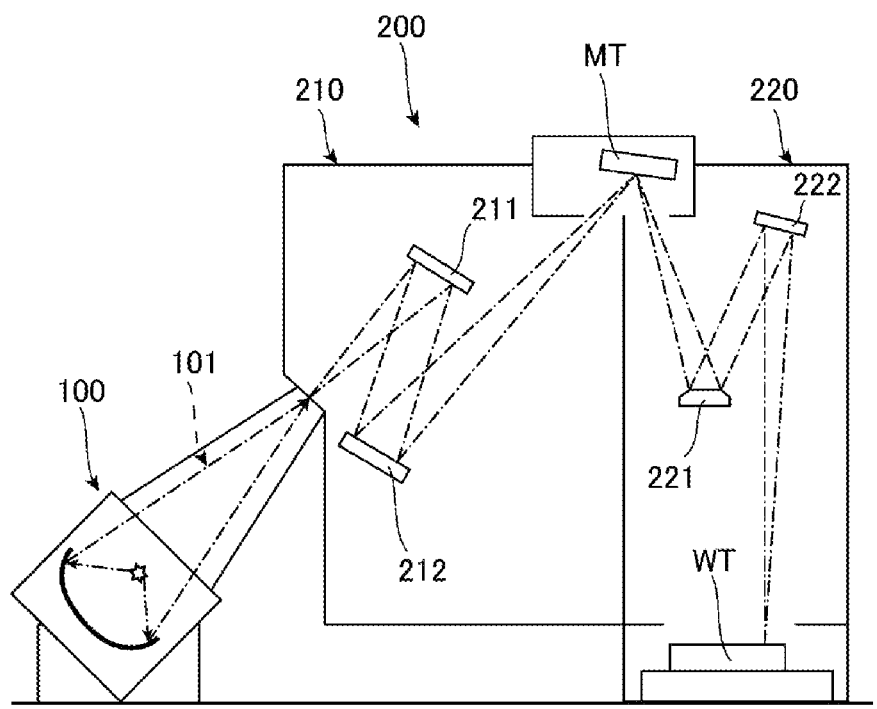
FIG. 1 is a schematic view showing a schematic configuration example of an entire electronic device manufacturing apparatus.

1. Overview
2. Description of Electronic Device Manufacturing Apparatus
3. Description of Extreme Ultraviolet Light Generation Apparatus of Comparative Example
   3.1 Configuration
   3.2 Operation
   3.3 Problem
4. Description of Extreme Ultraviolet Light Generation Apparatus of First Embodiment 4.1 Configuration 4.2 Operation 4.3 Effect
5. Description of Extreme Ultraviolet Light Generation Apparatus of Second Embodiment
   5.1 Configuration
   5.2 Operation
   5.3 Effect
6. Description of Extreme Ultraviolet Light Generation Apparatus of Third Embodiment
   6.1 Configuration
   6.2 Operation
   6.3 Effect Hereinafter, embodiments of the present disclosure will be described in detail with reference to the drawings. The embodiments described below show some examples of the present disclosure and do not limit the contents of the present disclosure. Also, all configurations and operation described in the embodiments are not necessarily essential as configurations and operation of the present disclosure. Here, the same components are denoted by the same reference numerals, and duplicate description thereof is omitted.

1. Overview

Embodiments of the present disclosure relate to an extreme ultraviolet light generation apparatus generating light having a wavelength of extreme ultraviolet (EUV) and an electronic device manufacturing apparatus. In the following, extreme ultraviolet light is referred to as EUV light in some cases.

2. Description of Electronic Device Manufacturing Apparatus

FIG. 1 is a schematic view showing a schematic configuration example of an entire electronic device manufacturing apparatus. The electronic device manufacturing apparatus shown in FIG. 1 includes an EUV light generation apparatus 100 and an exposure apparatus 200. The exposure apparatus 200 includes a mask irradiation unit 210 including a plurality of mirrors 211, 212 that constitute a reflection optical system, and a workpiece irradiation unit 220 including a plurality of mirrors 221, 222 that constitute a reflection optical system different from the reflection optical system of the mask irradiation unit 210. The mask irradiation unit 210 illuminates, via the mirrors 211, 212, a mask pattern of a mask table MT with EUV light 101 incident from the EUV light generation apparatus 100. The workpiece irradiation unit 220 images the EUV light 101 reflected by the mask table MT onto a workpiece (not shown) arranged on a workpiece table WT via the mirrors 221, 222. The workpiece is a photosensitive substrate such as a semiconductor wafer on which photoresist is applied. The exposure apparatus 200 synchronously translates the mask table MT and the workpiece table WT to expose the workpiece to the EUV light 101 reflecting the mask pattern. Through the exposure process as described above, a device pattern is transferred onto the semiconductor wafer, thereby a semiconductor device can be manufactured.

Figure 2:
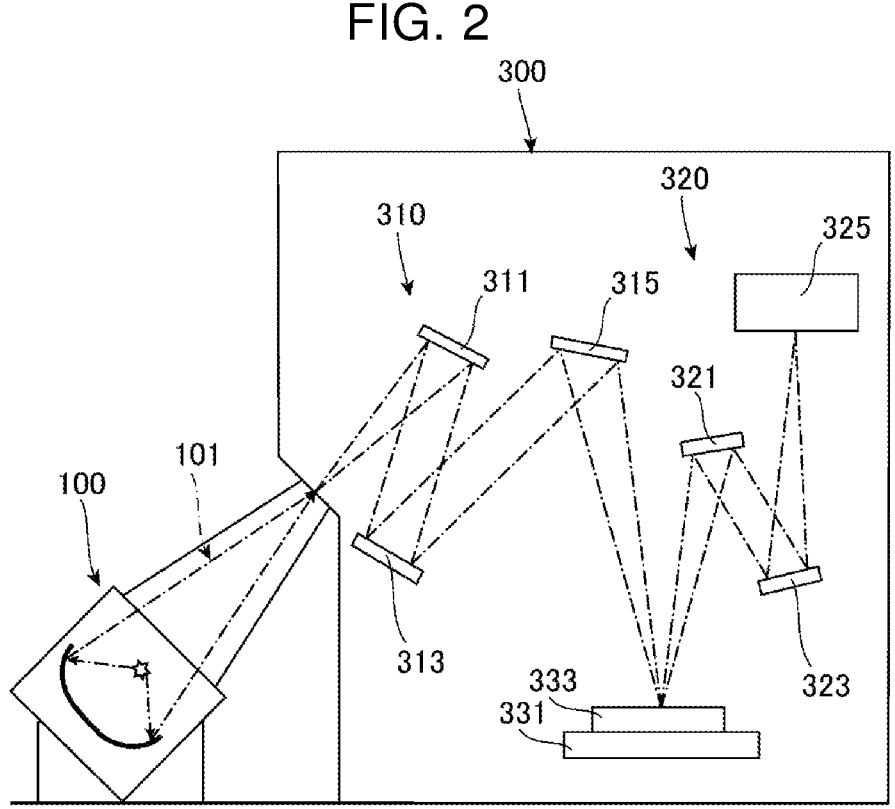
FIG. 2 is a schematic view showing a schematic configuration example of an inspection apparatus connected to the EUV light generation apparatus.

FIG. 2 is a schematic diagram showing a schematic configuration example of an inspection apparatus 300 connected to the EUV light generation apparatus 100. The inspection apparatus 300 includes an illumination optical system 310 including a plurality of mirrors 311, 313, 315 that constitute a reflection optical system, and a detection optical system 320 including a detector 325 and a plurality of mirrors 321, 322 that constitute a reflection optical system different from the reflection optical system of the illumination optical system 310. The illumination optical system 310 reflects, with the mirrors 311, 313, 315, the EUV light 101 incident from the EUV light generation apparatus 100 to illuminate a mask 333 placed on a mask stage 331. The mask 333 includes a mask blanks before a pattern is formed. The detection optical system 320 reflects, with the mirrors 321, 323, the EUV light 101 reflecting the pattern from the mask 333 and forms an image on a light receiving surface of the detector 325. The detector 325 having received the EUV light 101 obtains an image of the mask 333. The detector 325 is, for example, a time delay integration (TDI) camera. A defect of the mask 333 is inspected based on the image of the mask 333 obtained by the above-described process, and a mask suitable for manufacturing an electronic device is selected using the inspection result. Then, the electronic device can be manufactured by exposing and transferring the pattern formed on the selected mask onto the photosensitive substrate using the exposure apparatus 200.

3. Description of Extreme Ultraviolet Light Generation Apparatus of Comparative Example 3.1 Configuration The EUV light generation apparatus 100 of a comparative example will be described. The comparative example of the present disclosure is an example recognized by the applicant as known only by the applicant, and is not a publicly known example admitted by the applicant. Further, the following description will be given with reference to the EUV light generation apparatus 100 that outputs the EUV light 101 to the exposure apparatus 200 as an external apparatus as shown in FIG. 1. Here, the EUV light generation apparatus 100 that outputs the EUV light 101 to the inspection apparatus 300 as an external apparatus as shown in FIG. 2 can obtain the same operation and effect.

Figure 3:
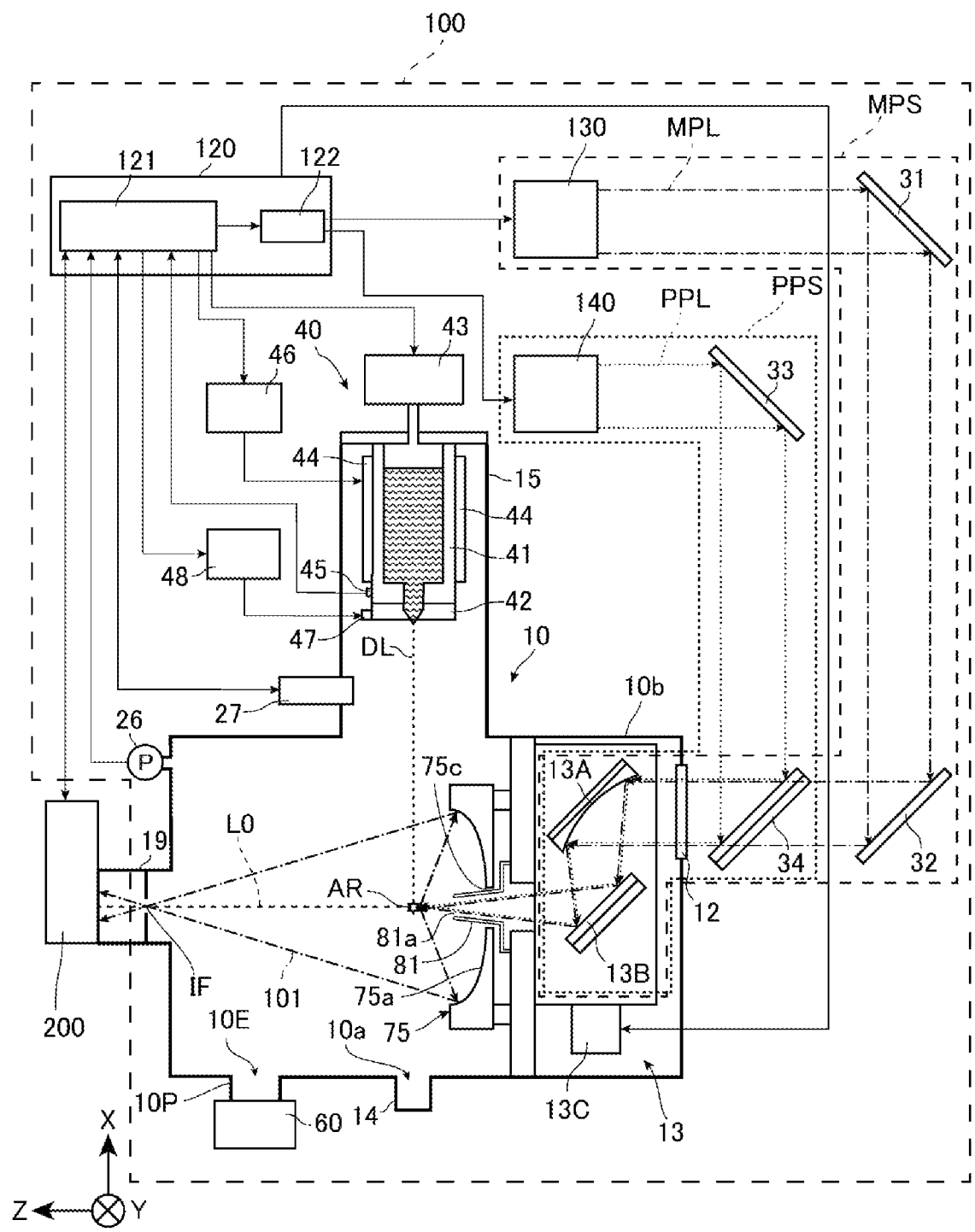
FIG. 3 is a schematic view showing a schematic configuration example of an entire extreme ultraviolet light generation apparatus of a comparative example.

FIG. 3 is a schematic diagram showing a schematic configuration example of the entire EUV light generation apparatus 100 of the present example. As shown in FIG. 3, the EUV light generation apparatus 100 mainly includes a chamber device 10, a main pulse laser light irradiation system MPS including a main pulse laser device 130, a prepulse laser light irradiation system PPS including a prepulse laser device 140, and a control system 120.

The chamber device 10 is a sealable container. The chamber device 10 includes an inner wall 10b surrounding the internal space having a low pressure atmosphere. The chamber device 10 also includes a sub-chamber 15. A target supply unit 40 is attached to the sub-chamber 15 to penetrate a wall of the sub-chamber 15. The target supply unit 40 includes a tank 41, a nozzle 42, and a pressure regulator 43 to supply a droplet target DL to the internal space of the chamber device 10. The droplet target DL is sometimes abbreviated as a droplet or a target.

The tank 41 stores therein a target substance which becomes the droplet target DL. The target substance contains tin. The inside of the tank 41 is in communication with the pressure regulator 43 which adjusts the pressure in the tank 41. A heater 44 and a temperature sensor 45 are attached to the tank 41. The heater 44 heats the tank 41 with a current applied from a heater power source 46. Through the heating, the target substance in the tank 41 melts. The temperature sensor 45 measures, via the tank 41, the temperature of the target substance in the tank 41. The pressure regulator 43, the temperature sensor 45, and the heater power source 46 are electrically connected to a processor 121 included in the control system 120.

The nozzle 42 is attached to the tank 41 and outputs the target substance. A piezoelectric element 47 is attached to the nozzle 42. The piezoelectric element 47 is electrically connected to a piezoelectric power source 48 and is driven by voltage applied from the piezoelectric power source 48. The piezoelectric power source 48 is electrically connected to the processor 121. The target substance output from the nozzle 42 is formed into the droplet target DL through operation of the piezoelectric element 47.

The chamber device 10 includes a target collection unit 14 which is a box body attached to an inner wall 10b of the chamber device 10 and communicates with the internal space of the chamber device 10 via an opening 10a formed at the inner wall 10b of the chamber device 10. The opening 10a is formed directly below the nozzle 42. The target collection unit 14 is a drain tank to collect any unnecessary droplet target DL having passed through the opening 10a and reaching the target collection unit 14.

At least one through hole is formed in the inner wall of the chamber device 10. The through hole is blocked by a window 12 through which pulse laser light output from the main pulse laser device 130 and the prepulse laser device 140 passes.

Further, a laser light concentrating optical system 13 is arranged at the internal space of the chamber device 10. The laser light concentrating optical system 13 includes a laser light concentrating mirror 13A and a high reflection mirror 13B. The laser light concentrating mirror 13A reflects and concentrates the laser light having passed through the window 12. The high reflection mirror 13B reflects light concentrated by the laser light concentrating mirror 13A. Positions of the laser light concentrating mirror 13A and the high reflection mirror 13B are adjusted by a laser light manipulator 13C so that a light concentration position of the laser light at the internal space of the chamber device 10 coincides with a position specified by the processor 121. The light concentration position is adjusted to be a position directly below the nozzle 42, and when the target substance is irradiated with the laser light at the light concentration position, plasma is generated by the irradiation, and the EUV light 101 is radiated from the plasma. The region in which plasma is generated is sometimes referred to as a plasma generation region AR.

For example, an EUV light concentrating mirror 75 having a spheroidal reflection surface 75a is arranged at the internal space of the chamber device 10. The reflection surface 75a reflects the EUV light 101 radiated from the plasma in the plasma generation region AR. The reflection surface 75a has a first focal point and a second focal point. The reflection surface 75a may be arranged such that, for example, the first focal point is located in the plasma generation region AR and the second focal point is located at an intermediate focal point IF. In FIG. 3, a straight line passing through the first focal point and the second focal point is shown as a focal line L0. In the following, the direction in which the focal line L0 extends may be referred to as the Z direction, the direction which is the discharge direction of the droplet target DL and is orthogonal to the Z direction may be referred to as the X direction, and the direction orthogonal to the Z direction and the X direction may be referred to as the Y direction.

Further, the EUV light generation apparatus 100 includes a connection portion 19 providing communication between the internal space of the chamber device 10 and the internal space of the exposure apparatus 200. A wall in which an aperture is formed is arranged in the connection portion 19. The wall is preferably arranged such that the aperture is located at the second focal point. The connection portion 19 is an outlet port of the EUV light 101 in the EUV light generation apparatus 100, and the EUV light 101 is output from the connection portion 19 and enters the exposure apparatus 200.

Further, the EUV light generation apparatus 100 includes a pressure sensor 26 and a target sensor 27. The pressure sensor 26 and the target sensor 27 are attached to the chamber device 10 and are electrically connected to the processor 121. The pressure sensor 26 measures the pressure at the internal space of the chamber device 10 and outputs a signal related to the pressure to the processor 121. The target sensor 27 has, for example, an imaging function, and detects the presence, trajectory, position, velocity, and the like of the droplet target DL output from the nozzle hole of the nozzle 42 in accordance with an instruction from the processor 121. The target sensor 27 may be arranged inside the chamber device 10, or may be arranged outside the chamber device 10 and detect the droplet target DL through a window (not shown) arranged on a wall of the chamber device 10. The target sensor 27 includes a light receiving optical system (not shown) and an imaging unit (not shown) such as a charge-coupled device (CCD) or a photodiode. In order to improve the detection accuracy of the droplet target DL, the light receiving optical system forms an image of the trajectory of the droplet target DL and the periphery thereof on a light receiving surface of the imaging unit. When the droplet target DL passes through a light concentration region of a light source unit (not shown) arranged to improve contrast in the field of view of the target sensor 27, the imaging unit detects a change of the light passing through the trajectory of the droplet target DL and the periphery thereof. The imaging unit converts the detected light change into an electric signal as a signal related to the image data of the droplet target DL, and outputs the electric signal to the processor 121.

The main pulse laser device 130 is configured by, for example, a YAG laser device or a $CO_2$ laser device, includes a master oscillator that performs burst operation, and outputs main pulse laser light MPL. In the burst operation, the main pulse laser light MPL is continuously output at a predetermined repetition frequency in a burst-on duration and the output of the main pulse laser light MPL is stopped in a burst-off duration.

The prepulse laser device 140 outputs prepulse laser light PPL linearly polarized in a predetermined direction. In the example of FIG. 3, the wavelength of the prepulse laser light PPL is different from the wavelength of the main pulse laser light MPL. Therefore, for example, when the main pulse laser device 130 is a YAG laser device, the prepulse laser device 140 is, for example, a $CO_2$ laser device. Here, the prepulse laser light PPL and the main pulse laser light MPL may have the same wavelength. In this case, the main pulse laser device 130 and the prepulse laser device 140 are, for example, both YAG laser devices or both $CO_2$ laser devices. The prepulse laser device 140 is configured to output the prepulse laser light PPL at the timing different from the timing at which the main pulse laser light MPL is output from the main pulse laser device 130. This control is performed by the control system 120 described below.

Travel directions of the main pulse laser light MPL and the prepulse laser light PPL are adjusted by a laser light delivery optical system including a plurality of mirrors. The laser light delivery optical system for adjusting the travel direction of the main pulse laser light MPL includes mirrors 31, 32. The laser light delivery optical system for adjusting the travel direction of the prepulse laser light PPL includes a mirror 33 and a beam combiner 34. The beam combiner 34 is arranged at a position where the optical path of the prepulse laser light PPL intersects with the optical path of the main pulse laser light MPL. In the present example, the beam combiner 34 arranged as described above is a dichroic mirror that reflects the prepulse laser light PPL and transmits the main pulse laser light MPL to substantially overlap the optical path of the main pulse laser light MPL with the optical path of the prepulse laser light PPL. The orientation of at least one of the mirrors 31, 32, 33 and the beam combiner 34 is adjusted by an actuator (not shown). According to this adjustment, the main pulse laser light MPL and the prepulse laser light PPL can be appropriately propagated through the window 12 to the internal space of the chamber device 10. Here, when the prepulse laser light PPL and the main pulse laser light MPL have the same wavelength and have polarization directions different from each other by 90°, the beam combiner 34 may be a polarizer.

The main pulse laser light irradiation system MPS is a system for irradiating a target substance with the main pulse laser light MPL. Therefore, in the present example, the main pulse laser light irradiation system MPS includes the mirrors 31, 32, the beam combiner 34, and the laser light concentrating optical system 13, in addition to the main pulse laser device 130. Further, the prepulse laser light irradiation system PPS is a system for irradiating a target substance with the prepulse laser light PPL. Therefore, in the present example, the prepulse laser light irradiation system PPS includes the mirror 33, the beam combiner 34, and the laser light concentrating optical system 13, in addition to the prepulse laser device 140.

The processor 121 of the control system 120 of the present disclosure is a processing device including a storage device in which a control program is stored and a central processing unit (CPU) that executes the control program. The processor 121 is specifically configured or programmed to perform various processes included in the present disclosure and controls the entire EUV light generation apparatus 100. The processor 121 receives a signal related to the pressure at the internal space of the chamber device 10, which is measured by the pressure sensor 26, a signal related to image data of the droplet target DL captured by the target sensor 27, a burst signal instructing the burst operation from the exposure apparatus 200, and the like. The processor 121 processes the various signals, and may control, for example, the timing at which the droplet target DL is output, the output direction of the droplet target DL, and the like. Further, the processor 121 may control output timings of the main pulse laser device 130 and the prepulse laser device 140, the travel directions and the light concentration positions of the main pulse laser light MPL and the prepulse laser light PPL, and the like. Such various kinds of control described above are merely exemplary, and other control may be added as necessary, as described later.

The processor 121 of the present example is electrically connected to the main pulse laser device 130 and the prepulse laser device 140 via a delay circuit 122 of the control system 120. The delay circuit 122 slightly changes the trigger signals output from the processor 121 for the main pulse laser device 130 and the prepulse laser device 140. Specifically, the trigger signals input to the main pulse laser device 130 and the prepulse laser device 140 are shifted so that the irradiation timing of the main pulse laser device 130 is set to be later than the irradiation timing of the prepulse laser device 140.

A central gas supply unit 81 for supplying an etching gas to the internal space of the chamber device 10 is arranged at the chamber device 10. As described above, since the target substance contains tin, the etching gas is, for example, a hydrogen-containing gas having a hydrogen gas concentration of 100% in effect. Alternatively, the etching gas may be, for example, a balance gas having a hydrogen gas concentration of approximately 3%. The balance gas contains nitrogen ($N_2$) gas and argon (Ar) gas. Tin fine particles and tin charged particles are generated when the target substance constituting the droplet target DL is turned into plasma in the plasma generation region AR by being irradiated with the main pulse laser light MPL. Tin constituting these fine particles and charged particles reacts with hydrogen contained in the etching gas supplied to the internal space of the chamber device 10. Through the reaction with hydrogen, tin becomes stannane ($SnH_4$) gas at room temperature.

The central gas supply unit 81 has a side surface shape of a circular truncated cone, and is inserted through a through hole 75c formed in the center of the EUV light concentrating mirror 75. The central gas supply unit 81 is called a cone in some cases. Further, the central gas supply unit 81 has a central gas supply port 81a being a nozzle. The central gas supply port 81a is arranged on the focal line L0 at the reflection surface 75a. The focal line L0 is extended along the center axis direction of the reflection surface 75a. The central gas supply port 81a supplies the etching gas from the center side of the reflection surface 75a toward the plasma generation region AR. Here, it is preferable that the etching gas is supplied from the central gas supply port 81a along the focal line L0 in the direction away from the reflection surface 75a from the center side of the reflection surface 75a. The central gas supply port 81a is connected to a gas supply device (not shown) being a tank through a pipe (not shown) of the central gas supply unit 81 and the etching gas is supplied therefrom. The gas supply device is driven and controlled by the processor 121. A supply gas flow rate adjusting unit being a valve (not shown) may be arranged in the pipe (not shown).

The central gas supply port 81a is a gas supply port for supplying the etching gas to the internal space of the chamber device 10 as well as an outlet port through which the prepulse laser light PPL and the main pulse laser light MPL are output to the internal space of the chamber device 10. The prepulse laser light PPL and the main pulse laser light MPL travel toward the internal space of the chamber device 10 through the window 12 and the central gas supply port 81a.

An exhaust port 10E is arranged at the inner wall 10b of the chamber device 10. Since the exposure apparatus 200 is arranged on the focal line L0, the exhaust port 10E is arranged at the inner wall 10b on the side lateral to the focal line L0. The direction along the center axis of the exhaust port 10E is, for example, perpendicular to the focal line L0. The exhaust port 10E is arranged on the side opposite to the reflection surface 75a with respect to the plasma generation region AR when viewed from the direction perpendicular to the focal line L0. The exhaust port 10E exhausts gas at the internal space of the chamber device 10. The exhaust port 10E is connected to an exhaust pipe 10P, and the exhaust pipe 10P is connected to an exhaust pump 60.

As described above, when the target substance is turned into plasma in the plasma generation region AR, the residual gas as exhaust gas is generated at the internal space of the chamber device 10. The residual gas contains tin fine particles and tin charged particles generated through the plasma generation from the target substance, stannane generated through the reaction of the tin fine particles and tin charged particles with the etching gas, and unreacted etching gas. Some of the charged particles are neutralized at the internal space of the chamber device 10, and the residual gas contains the neutralized charged particles as well. The residual gas is suctioned to the exhaust pump 60 through the exhaust port 10E and the exhaust pipe 10P.

Figure 4:
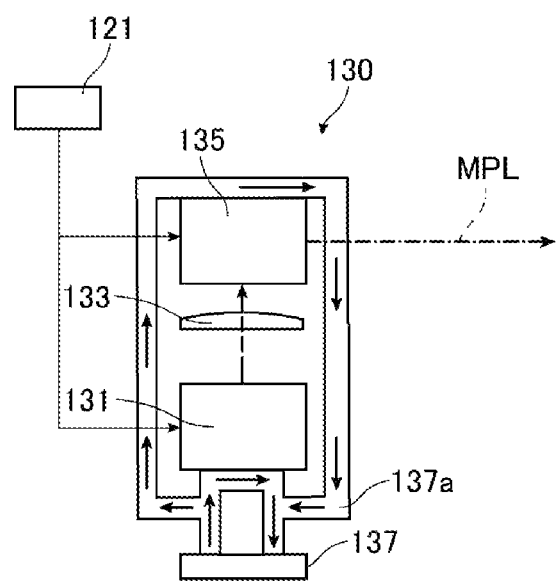
FIG. 4 is a schematic view showing a schematic configuration example of a main pulse laser device.

FIG. 4 is a schematic view showing a schematic configuration example of the main pulse laser device 130. The main pulse laser device 130 includes a first laser light source 131, a first lens 133, a laser oscillator 135, and a temperature regulator 137.

The first laser light source 131 may be, for example, a laser diode bar. In the laser diode bar, a plurality of laser diodes are arranged in a row on the same substrate. Each of the laser diodes outputs first excitation light toward the laser oscillator 135 through the first lens 133. The first excitation light has a wavelength of, for example, about 808 nm. In FIG. 4, respective beams of the first excitation light are collectively indicated by one arrow of a broken line. The first laser light source 131 is connected to the processor 121 via the delay circuit 122 and is controlled by the processor 121. Here, the delay circuit 122 is not shown in FIG. 4.

Figure 5:
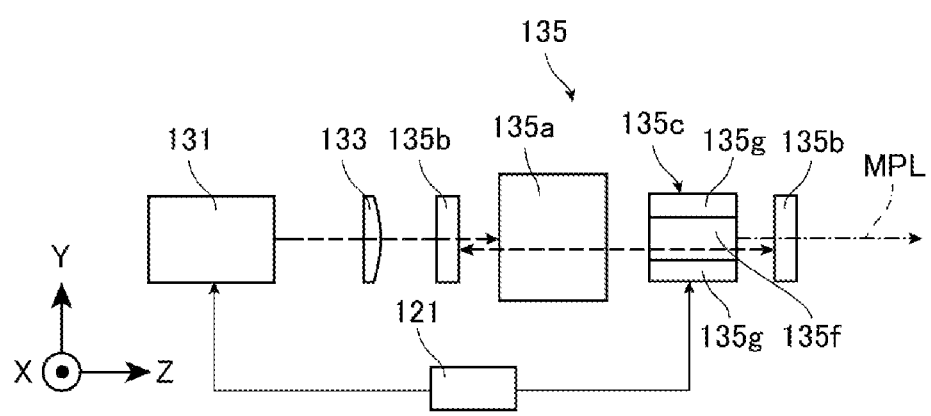
FIG. 5 is a schematic view showing a schematic configuration example of a laser oscillator.

The first lens 133 is a cylindrical convex lens arranged between the first laser light source 131 and the laser oscillator 135. The convex surface of the first lens 133 faces the laser oscillator 135, and the first lens 133 concentrates the first excitation light from the first laser light source 131 on a laser crystal 135a (described later) of the laser oscillator 135. In FIG. 4 and FIG. 5 described later, the first excitation light is not shown.

FIG. 5 is a schematic view showing a schematic configuration example of the laser oscillator 135. The laser oscillator 135 includes a laser crystal 135a, resonator mirrors 135b, and a Pockels cell 135c.

The laser crystal 135a is doped with an active medium. Examples of the active medium include Nd:YAG, Nd:YVO$_4$, and Yb:YAG. The active medium is excited by the first excitation light from the first laser light source 131 and emits light.

The resonator mirrors 135b are configured of a pair of mirrors, and the laser crystal 135a and the Pockels cell 135c are arranged between the pair of mirrors. One mirror is arranged between the first lens 133 and the laser crystal 135a, and the Pockels cell 135c is arranged between the laser crystal 135a and the other mirror. The one mirror is a dichroic mirror that transmits the first excitation light from the first laser light source 131 and reflects at least a part of the light from the laser crystal 135a toward the laser crystal 135a. The other mirror is a polarizing mirror that reflects, toward the laser crystal 135a, light whose polarization direction is not changed by the Pockels cell 135c out of the light from the laser crystal 135a, and transmits the light whose polarization direction is changed by the Pockels cell 135c toward the mirror 31 (not shown in FIG. 5). In FIG. 5, the light from the laser crystal 135a toward the resonator mirrors 135b is indicated by a broken line arrow, and the arrow is shifted from the arrow indicating the first excitation light for ease of viewing.

The Pockels cell 135c includes an electro-optic crystal 135f and a pair of electrodes 135g sandwiching the electro-optic crystal 135f. The Pockels cell 135c rotates the polarization direction of the light passing through the electro-optic crystal 135f by 90 degrees when a voltage is applied between the pair of electrodes 135g from a power source (not shown). The Pockels cell 135c does not rotate the polarization direction of the light passing through the electro-optic crystal 135f when a voltage is not applied between the pair of electrodes 135g. The pair of electrodes 135g is connected to the processor 121 via the delay circuit 122, and the timing of voltage application is appropriately controlled by the processor 121. Here, the delay circuit 122 is not shown in FIG. 5.

The first excitation light from the first laser light source 131 is concentrated on the laser crystal 135a by the first lens 133 to excite the active medium of the laser crystal 135a. As a result, the laser crystal 135a emits spontaneous emission light, and a part of the spontaneous emission light travels to one mirror of the resonator mirrors 135b, and another part of the light travels to the other mirror through the Pockels cell 135c. When a voltage is not applied between the electrodes 135g of the Pockels cell 135c, the light reciprocates between the resonator mirrors 135b. Thus, the laser crystal 135a and the resonator mirrors 135b constitute a Fabry-Perot resonator. When reciprocating between the resonator mirrors 135b, the light is amplified as passing through the laser crystal 135a. When a voltage is applied between the pair of electrodes 135g of the Pockels cell 135c, the polarization direction of the amplified light is changed as passing through the electro-optic crystal 135f. In the Pockels cell 135c, the timing of the voltage application is controlled by the processor 121. As a result, the light whose polarization direction has been changed is transmitted through the other mirror of the resonator mirrors 135b and travels toward the mirror 31 as the main pulse laser light MPL. In FIGS. 4 and 5, the travel direction of the first excitation light and the main pulse laser light MPL are shown differently from each other for ease of viewing. In particular, FIG. 4 simply shows the travel directions of the first excitation light and the main pulse laser light MPL, and does not show the actual travel paths thereof.

Referring back to FIG. 4, the temperature regulator 137 will be described. The temperature regulator 137 is a chiller that adjusts the temperature of a cooling medium that cools the first laser light source 131 and the laser oscillator 135, and cools the first laser light source 131 and the laser oscillator 135 with the cooling medium. In FIG. 5, the temperature regulator 137 is not shown. Examples of the cooling medium include a liquid. In the comparative example, the temperature of the cooling medium is set to a predetermined temperature.

A part of the pipe 137a is connected to the temperature regulator 137 and the first laser light source 131 so that the cooling medium circulates through the temperature regulator 137 and the first laser light source 131. In FIG. 4, the flow of the cooling medium in the pipe 137a is indicated by solid arrows. The first laser light source 131 is connected to the pipe 137a. Specifically, the above-described substrate on which the plurality of laser diodes in the first laser light source 131 are arranged is arranged on the pipe 137a. The cooling medium cools the first laser light source 131 through the pipe 137a and the substrate.

Another part of the pipe 137a branches from a portion of the pipe 137a where the cooling medium travels from the temperature regulator 137 to the first laser light source 131. The branched pipe 137a extends to the laser oscillator 135, is connected to the laser oscillator 135, and joins a portion of the pipe 137a where the cooling medium returns from the first laser light source 131 to the temperature regulator 137. In this manner, the other part of the pipe 137a is connected to each of the temperature regulator 137 and the laser oscillator 135 such that the cooling medium circulates through the temperature regulator 137 and the laser oscillator 135. At the connection between the pipe 137a and the laser oscillator 135, a substrate (not shown) on which the laser crystal 135a is arranged is arranged on the pipe 137a. The cooling medium cools the laser crystal 135a through the pipe 137a and the substrate.

As described above, the first laser light source 131 and the laser oscillator 135 are cooled by the same cooling medium. After cooling, the cooling medium returns to the temperature regulator 137 through the pipe 137a, and after the temperature is regulated again by the temperature regulator 137, the cooling medium flows to the first laser light source 131 and the laser oscillator 135 as described above, and cools each of them. The arrangement position of the pipe 137a and the circulation direction of the cooling medium are not particularly limited.

3.2 Operation

Next, operation of the EUV light generation apparatus 100 of the comparative example will be described.

In the EUV light generation apparatus 100, for example, at the time of new installation or maintenance or the like, atmospheric air at the internal space of the chamber device 10 is exhausted. At this time, purging and exhausting of the internal space of the chamber device 10 may be repeated for exhausting atmospheric components. For example, an inert gas such as nitrogen or argon is preferably used for the purge gas. Thereafter, when the pressure at the internal space of the chamber device 10 becomes equal to or lower than a predetermined pressure, the processor 121 starts introduction of the etching gas from the gas supply device to the internal space of the chamber device 10 through the central gas supply unit 81. At this time, the processor 121 may control the supply gas flow rate adjusting unit (not shown) and the exhaust pump 60 so that the pressure at the internal space of the chamber device 10 is maintained at a predetermined pressure. Thereafter, the processor 121 waits until a predetermined time elapses from the start of introduction of the etching gas.

Further, the processor 121 causes the gas at the internal space of the chamber device 10 to be exhausted from the exhaust port 10E by the exhaust pump 60, and keeps the pressure at the internal space of the chamber device 10 substantially constant based on the signal according to the pressure at the internal space of the chamber device 10 measured by the pressure sensor 26.

In order to heat and maintain the target substance in the tank 41 to and at a predetermined temperature equal to or higher than the melting point, the processor 121 causes the heater power source 46 to supply current to the heater 44 to increase temperature of the heater 44. In this case, the processor 121 controls the temperature of the target substance to the predetermined temperature by adjusting a value of the current supplied from the heater power source 46 to the heater 44 based on an output from the temperature sensor 45. When the target substance is tin, the predetermined temperature is equal to or higher than about 231° C. being the melting point of tin and, for example, is 240° C. or higher and 290° C. or lower. Thus, the preparation for outputting the droplet target DL is completed.

When the preparation is completed, the processor 121 causes the pressure regulator 43 to supply the inert gas from the gas supply source to the tank 41 and to adjust the pressure in the tank 41 so that the melted target substance is output through the nozzle hole of the nozzle 42 at a predetermined velocity. Under this pressure, the target substance is output into the chamber device 10 through the nozzle hole. The target substance output through the nozzle hole may be in the form of a jet. At this time, the processor 121 causes the piezoelectric power source 48 to apply voltage having a predetermined waveform to the piezoelectric element 47 to generate the droplet target DL. The predetermined waveform is, for example, a sine wave, a rectangular wave, or a sawtooth wave. Vibration of the piezoelectric element 47 can propagate through the nozzle 42 to the target substance to be output through the nozzle hole of the nozzle 42. The target substance is divided at a predetermined cycle by the vibration into liquid droplet targets DL. The diameter of the droplet target DL is approximately 20 µm or less.

When the droplet target DL is output, the target sensor 27 detects the passage timing of the droplet target DL passing through a predetermined position at the internal space of the chamber device 10. The processor 121 outputs the trigger signal to control the timing of outputting the prepulse laser light PPL from the prepulse laser device 140 based on the signal from the target sensor 27 so that the droplet target DL is irradiated with the prepulse laser light PPL. The trigger signal from the processor 121 is input to the prepulse laser device 140 and the main pulse laser device 130 via the delay circuit 122. Here, the delay circuit 122 outputs the trigger signal to the prepulse laser device 140 prior to the main pulse laser device 130. The prepulse laser device 140 outputs the prepulse laser light PPL when the trigger signal is input. At the timing when the prepulse laser light PPL is output, the main pulse laser light MPL is not output.

The prepulse laser light PPL is a picosecond pulse laser light having a temporal pulse width of, for example, 10 ps or more and 100 ps or less, or a nanosecond pulse laser light having a pulse width of, for example, 10 ns or more and 300 ns or less. Here, the above pulse width is an interval between times when the intensity of the laser light becomes a half value of the maximum value before and after the intensity becomes the maximum value. The picosecond pulse laser light and the nanosecond pulse laser light have substantially the same energy per pulse. Therefore, the picosecond pulse laser light has a higher energy density than the nanosecond pulse laser light. Here, the fluence of the prepulse laser light PPL is, for example, 0.1 J/cm$^2$ or more and 100 J/cm$^2$ or less. Preferably, the fluence is equal to or larger than to 1 J/cm$^2$ and equal to or smaller than 20 J/cm$^2$ for picosecond pulse laser light and equal to or larger than 1 J/cm$^2$ and equal to or smaller than 3 J/cm$^2$ for nanosecond pulse laser light. The prepulse laser light PPL having linear polarization and output from the prepulse laser device 140 is reflected by the mirror 33 and the beam combiner 34, and is radiated to the droplet target DL via the laser light concentrating optical system 13. At this time, the processor 121 controls the laser light manipulator 13C of the laser light concentrating optical system 13 so that the prepulse laser light PPL is concentrated in the vicinity of the plasma generation region AR. The droplet target DL irradiated with the prepulse laser light PPL is diffused by laser ablation due to the energy of the laser light, and becomes a diffusion target. Therefore, the prepulse laser light irradiation system PPS is a system for generating a diffusion target by irradiating the droplet target DL with the prepulse laser light PPL.

Since the diffusion target is a diffused target of the droplet target DL, the diameter thereof is larger than that of the droplet target DL, and the density thereof is lower than that of the droplet target DL.

When the trigger signal is input to the main pulse laser device 130 with a delay from the timing at which the trigger signal is input to the prepulse laser device 140, the main pulse laser device 130 outputs the main pulse laser light MPL. Specifically, the processor 121 causes the first excitation light to be output from the first laser light source 131. When the first excitation light enters the laser oscillator 135, the laser oscillator 135 causes laser oscillation and outputs the main pulse laser light MPL by the Pockels cell 135c. At this time, the cooling medium flows through the pipe 137a and cools the first laser light source 131 and the laser oscillator 135. The time difference between the output timing of the prepulse laser light PPL and the output timing of the main pulse laser light MPL is, for example, 50 ns or more and 500 ns or less in the case of the picosecond pulse laser light, and 50 ns or more and 150 ns or less in the case of the nanosecond pulse laser light. The processor 121 and the delay circuit 122 output the light emission trigger signal to control the timing at which the main pulse laser light MPL is output from the main pulse laser device 130 so that the diffusion target is irradiated with the main pulse laser light MPL.

The main pulse laser light MPL is laser light having a pulse width of, for example, 1 ns or more and 50 ns or less, more preferably of 15 ns or more and 20 ns or less. The main pulse laser light MPL output from the main pulse laser device 130 is reflected by the mirrors 31, 32, transmitted through the beam combiner 34, and radiated to the diffusion target in the plasma generation region AR via the laser light concentrating optical system 13. At this time, the processor 121 controls the laser light manipulator 13C of the laser light concentrating optical system 13 so that the main pulse laser light MPL is concentrated in the plasma generation region AR. The diffusion target irradiated with the main pulse laser light MPL is turned into plasma due to the energy of the laser light, and light including EUV light is radiated from the plasma. Thus, the main pulse laser light irradiation system MPS is a system for generating EUV light by irradiating the diffusion target with the main pulse laser light MPL.

When the diffusion target in which the density of the target substance is lowered is irradiated with the main pulse laser light MPL, a larger amount of the target substance may be turned into plasma and EUV light may be efficiently radiated, compared to a case in which the droplet target DL is directly irradiated with the main pulse laser light MPL.

Among the light including the EUV light generated in the plasma generation region AR, the EUV light 101 is concentrated at the intermediate focal point IF by the EUV light concentrating mirror 75, and then, is incident on the exposure apparatus 200 from the connection portion 19.

Here, when the target substance is turned into plasma, tin fine particles are generated as described above. The fine particles diffuse to the internal space of the chamber device 10. The fine particles diffusing to the internal space of the chamber device 10 react with the hydrogen-containing etching gas supplied from the central gas supply unit 81 to become stannane. Most of the stannane obtained through the reaction with the etching gas flows into the exhaust port 10E along with the flow of the unreacted etching gas. At least some of the unreacted charged particles, fine particles, and etching gas flow into the exhaust port 10E. The unreacted etching gas, fine particles, charged particles, stannane, and the like having flowed into the exhaust port 10E flow as residual gas through the exhaust pipe 10P into the exhaust pump 60 and are subjected to predetermined exhaust treatment such as detoxification.

3.3 Problem

The optimum temperature for cooling the cooling medium when the cooling medium cools the first laser light source 131 varies with the deterioration of the first laser light source 131 and the like. Therefore, when the deterioration occurs while the temperature of the cooling medium is set to a predetermined temperature, the temperature of the cooling medium may deviate from the optimum temperature, and the first laser light source 131 may be less likely to be cooled than expected. As a result, the wavelength of the first excitation light output from the first laser light source 131 may change, and the inversion efficiency of the electrons in the laser crystal 135a of the laser oscillator 135 may decrease due to the change in the wavelength. As a result, the pulse energy of the main pulse laser light MPL may decrease and deviate from the target range of the pulse energy. In this case, the exposure apparatus 200 once stops the EUV light generation apparatus 100. Then, the processor 121 causes the laser oscillator 135 to perform laser oscillation with the first excitation light to output the main pulse laser light MPL, and acquires again the optimum temperature for cooling the cooling medium such that the pulse energy of the main pulse laser light MPL falls within the target range. Finally, an administrator of the EUV light generation apparatus 100 resets the temperature of the cooling medium to the optimum temperature with respect to the temperature regulator 137. However, at this optimum temperature, the pulse energy falls within the target range of the pulse energy, but the pulse time width of the main pulse laser light MPL may be extended and not fall within the target range of the pulse time width. Therefore, even when the first laser light source 131 is cooled with the cooling medium having the optimum temperature for the pulse energy, the pulse time width of the main pulse laser light MPL may deviate from the target range of the pulse time width. When the pulse energy and the pulse time width do not fall within the respective target ranges, the generation efficiency of plasma may decrease. As a result, the EUV light 101 that satisfies the performance required by the exposure apparatus 200 or the inspection apparatus 300 may not be output, and the reliability of the EUV light generation apparatus 100 may decrease.

Therefore, in each of the following embodiments, the EUV light generation apparatus 100 capable of suppressing a decrease in reliability will be exemplified.

4. Description of Extreme Ultraviolet Light Generation Apparatus of First Embodiment Next, the configuration of the EUV light generation apparatus 100 of a first embodiment will be described. Any component same as that described above is denoted by an identical reference sign, and duplicate description thereof is omitted unless specific description is needed.

4.1 Configuration

Figure 6:
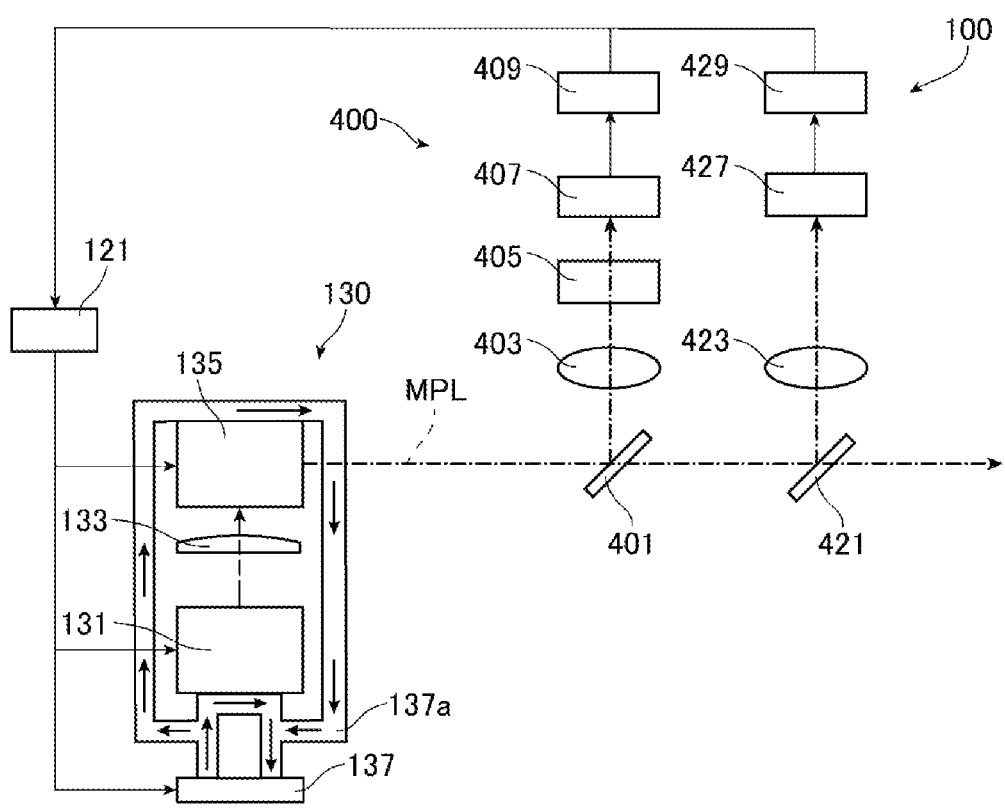
FIG. 6 is a schematic view showing a schematic configuration example of a part of the extreme ultraviolet light generation apparatus of a first embodiment.

FIG. 6 is a schematic view showing a schematic configuration example of a part of the EUV light generation apparatus 100 of the present embodiment. The EUV light generation apparatus 100 of the present embodiment is different from the EUV light generation apparatus 100 of the comparative example in that the EUV light generation apparatus 100 further includes a measurement instrument 400 and the processor 121 controls the temperature regulator 137.

The measurement instrument 400 is arranged on the downstream side of the laser oscillator 135 with respect to the travel direction of the main pulse laser light MPL output from the laser oscillator 135. The measurement instrument 400 includes a first beam splitter 401, a first light concentrating lens 403, an integrating sphere 405, a first photodiode 407, and an integrating circuit 409.

The first beam splitter 401 is arranged on an optical path of the main pulse laser light MPL from the laser oscillator 135 to the plasma generation region AR, and is preferably arranged between the laser oscillator 135 and the mirror 31 on the optical path. The first beam splitter 401 transmits a part of the main pulse laser light MPL output from the laser oscillator 135, and reflects another part of the main pulse laser light MPL toward the first light concentrating lens 403. The first light concentrating lens 403 concentrates the main pulse laser light MPL reflected by the first beam splitter 401 on a part of the inner wall of the integrating sphere 405. The integrating sphere 405 diffuses and reflects, for multiple times, the main pulse laser light MPL concentrated on a part of the inner wall by the first light concentrating lens 403 on the inner wall of the integrating sphere 405 to homogenize the intensity of the main pulse laser light MPL, and outputs the main pulse laser light MPL to the first photodiode 407. The first photodiode 407 receives the main pulse laser light MPL from the integrating sphere 405, and outputs a signal corresponding to the light intensity of the main pulse laser light MPL to the integrating circuit 409 when receiving the main pulse laser light MPL. The first photodiode 407 does not output a signal unless it receives the main pulse laser light MPL. The integrating circuit 409 integrates the signal from the first photodiode 407 to measure the pulse energy of the main pulse laser light MPL. The integrating circuit 409 is connected to the processor 121 and outputs a signal related to the measured pulse energy of the main pulse laser light MPL to the processor 121.

The measurement instrument 400 further includes a second beam splitter 421, a second light concentrating lens 423, a second photodiode 427, and a detection circuit 429.

The second beam splitter 421 is arranged on the optical path of the main pulse laser light MPL from the laser oscillator 135 to the plasma generation region AR, and is preferably arranged between the laser oscillator 135 and the mirror 31. The second beam splitter 421 of the present embodiment is arranged between the first beam splitter 401 and the mirror 31 with respect to the travel direction of the main pulse laser light MPL output from the laser oscillator 135. The second beam splitter 421 transmits a part of the main pulse laser light MPL transmitted through the first beam splitter 401 toward the mirror 31, and reflects another part of the main pulse laser light MPL toward the second light concentrating lens 423. The second light concentrating lens 423 concentrates the main pulse laser light MPL reflected by the second beam splitter 421 on the second photodiode 427. The second photodiode 427 receives the main pulse laser light MPL concentrated by the second light concentrating lens 423, and outputs a signal to the detection circuit 429 when the main pulse laser light MPL is received, and does not output a signal when the main pulse laser light MPL is not received. The detection circuit 429 detects a rising signal and a falling signal among the signals from the photodiode, and measures the pulse time width of the main pulse laser light MPL from the detection. The detection circuit 429 is connected to the processor 121 and outputs a signal related to the measured pulse time width of the main pulse laser light MPL to the processor 121.

The processor 121 of the present embodiment is connected to the temperature regulator 137 and controls the temperature of the cooling medium at the temperature regulator 137. This control will be described later. Examples of the cooling medium of the present embodiment include a liquid such as water. The liquid may be other than water, and the cooling medium may be a gas such as water vapor.

4.2 Operation

Next, operation of the processor 121 of the present embodiment will be described.

Figure 7:
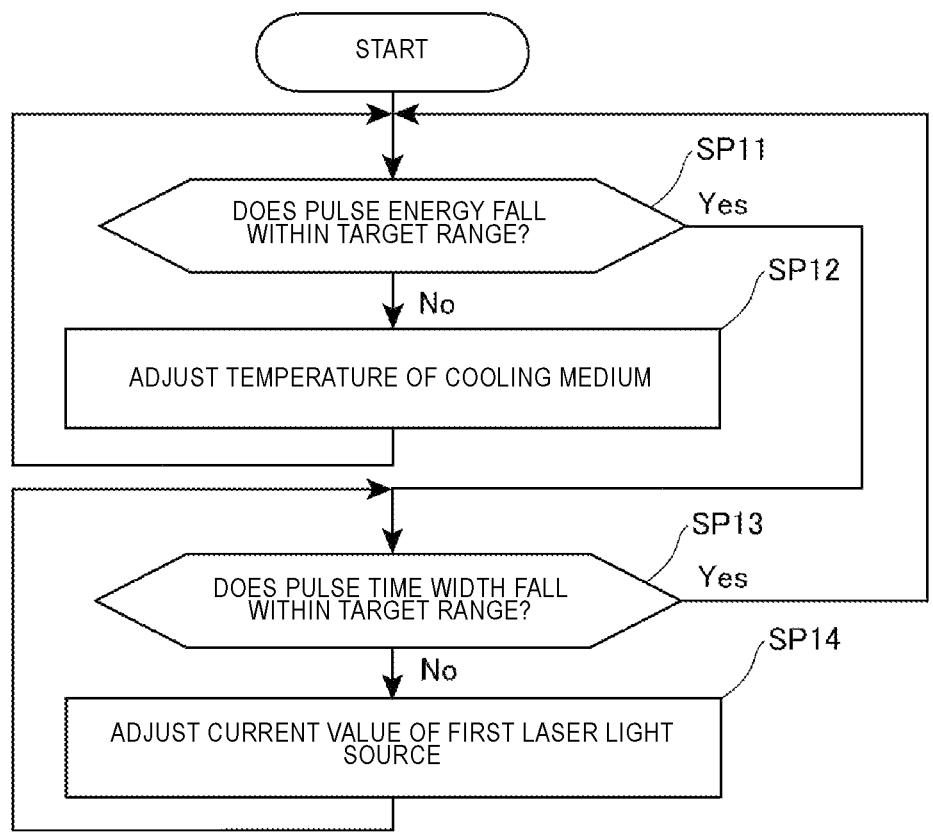
FIG. 7 is a diagram showing a part of a control flowchart of a processor according to the first embodiment.

FIG. 7 is a diagram showing a control flowchart of the processor 121 of the present embodiment. The control flowchart of the present embodiment includes steps SP11 to SP14. The start state shown in FIG. 7 is different from that of the comparative example in that a part of the main pulse laser light MPL is reflected by each of the beam splitters 401, 421, and the pulse energy and the pulse time width of the main pulse laser light MPL are measured by the measurement instrument 400. Hereinafter, the pulse energy of the main pulse laser light MPL and the pulse time width of the main pulse laser light MPL may be simply referred to as the pulse energy and the pulse time width, respectively. The signals related to the pulse energy and the pulse time width respectively are input from the measurement instrument 400 to the processor 121. In the start state, as in the comparative example, the cooling medium flows through the pipe 137a to cool the first laser light source 131 and the laser oscillator 135. Further, the prepulse laser light PPL and the main pulse laser light MPL travel to the plasma generation region AR, the EUV light 101 is generated in the plasma generation region AR, and the EUV light 101 enters the exposure apparatus 200.

(Step SP11)

In the present step, when the pulse energy measured by the measurement instrument 400 does not fall within the target range of the pulse energy, the processor 121 advances the control flow to step SP12. When the measured pulse energy falls within the target range, the processor 121 advances the control flow to step SP13.

(Step SP12)

In the present step, the processor 121 controls the temperature regulator 137 that adjusts the temperature of the cooling medium so that the pulse energy measured by the measurement instrument 400 falls within the target range of the pulse energy. Specifically, when the pulse energy measured by the measurement instrument 400 is smaller than the target range of the pulse energy, the processor 121 controls the temperature regulator 137 to lower the temperature of the cooling medium.

The cooling medium having been cooled in the present step flows through the pipe 137a and travels to the first laser light source 131 and the laser oscillator 135 to cool each of them. When the cooling medium cools each of them, the cooling medium flows through the pipe 137a and returns to the temperature regulator 137, and the temperature is adjusted again at the temperature regulator 137. When the temperature of the cooling medium is lowered, the cooling medium easily cools the first laser light source 131, and a change in the wavelength of the first excitation light output from the first laser light source 131 is suppressed by the cooling. As a result, a decrease in the inversion efficiency of the electrons in the laser crystal 135a of the laser oscillator 135 is suppressed, and the pulse energy falls within the target range. Here, since the variation of the pulse energy is often caused by deterioration of the first laser light source 131 and the like, the pulse energy is less likely to become larger than a target value. If the pulse energy is larger than the target value, the processor 121 may control the temperature regulator 137 to increase the temperature of the cooling medium. The processor 121 returns the control flow to step SP11 after controlling the temperature regulator 137 that adjusts the temperature of the cooling medium. Then, when the pulse energy falls within the target range of the pulse energy in step SP11, the processor 121 advances the control flow to step SP13.

(Step SP13)

In the present step, when the pulse time width measured by the measurement instrument 400 falls within the target range of the pulse time width, the processor 121 returns the control flow to step SP11. Further, when the measured pulse time width does not fall within the target range, the processor 121 advances the control flow to step SP14.

(Step SP14)

In the present step, the processor 121 adjusts the current value of the current supplied to the first laser light source 131 so that the pulse time width measured by the measurement instrument 400 falls within the target range of the pulse time width. Specifically, the processor 121 decreases the current value when the pulse time width measured by the measurement instrument 400 is smaller than the target range of the pulse time width, and increases the current value when the pulse time width is larger than the target range of the pulse time width. This is because the pulse time width increases as the current value decreases, and the pulse time width decreases as the current value increases.

After adjusting the current value, the processor 121 returns the control flow to step SP13. When the pulse time width falls within the target range of the pulse time width in step SP13, the processor 121 returns the control flow to step SP11. Since the pulse energy has already fallen within the target range of the pulse energy in steps SP11, SP12, when the pulse time width falls within the target range of the pulse time width in steps SP13, SP14, the pulse energy and the pulse time width fall within the respective target ranges.

4.3 Effect

In the EUV light generation apparatus 100 of the present embodiment, the processor 121 controls the temperature regulator 137 to regulate the temperature of the cooling medium so that the pulse energy measured by the measurement instrument 400 falls within the target range of the pulse energy in step SP12, and adjusts the current value of the current supplied to the first laser light source 131 so that the pulse time width measured by the measurement instrument 400 falls within the target range of the pulse time width in step SP14.

In the EUV light generation apparatus 100, the processor 121 controls the temperature regulator 137 that adjusts the temperature of the cooling medium so that the pulse energy measured by the measurement instrument 400 falls within the target range of the pulse energy. By adjusting the temperature as described above, even when the first laser light source 131 deteriorates and the optimum temperature for cooling the cooling medium when the cooling medium cools the first laser light source 131 changes, the deviation between the temperature of the cooling medium and the optimum temperature can be suppressed. When the deviation is suppressed, the first laser light source 131 can be easily cooled, and a change in the wavelength of the first excitation light output from the first laser light source 131 can be suppressed by the cooling. Accordingly, the pulse energy may fall within the target range. When the processor 121 controls the temperature regulator 137 that adjusts the temperature of the cooling medium based on the pulse energy as described above, the temperature of the cooling medium may not be an optimum temperature for the pulse time width. However, in the EUV light generation apparatus 100, the processor 121 adjusts the current value of the current supplied to the first laser light source 131 so that the pulse time width measured by the measurement instrument 400 falls within the target range of the pulse time width after controlling the temperature regulator 137 that adjusts the temperature of the cooling medium. When the pulse energy and the pulse time width fall within the respective target ranges as described above, a decrease in the generation efficiency of plasma can be suppressed. As a result, the EUV light 101 that satisfies the performance required by the exposure apparatus 200 or the inspection apparatus 300 can be output, and a decrease in reliability of the EUV light generation apparatus 100 can be suppressed. In addition, according to the EUV light generation apparatus 100 of the present embodiment, the pulse energy and the pulse time width can be set within the respective target ranges without stopping the EUV light generation apparatus 100.

Further, in the EUV light generation apparatus 100 of the present embodiment, the processor 121 adjusts the current value in step SP14 and then returns the flow from step SP13 to steps SP11, SP12 to control the temperature regulator 137 that adjusts the temperature of the cooling medium again.

According to this configuration, as compared with the case in which the temperature regulator 137 is not controlled again, it is possible to suppress a case in which the pulse time width falls within the target range of the pulse time width due to the adjustment of the current value but the pulse energy deviates again from the target range of the pulse energy due to the adjustment. Therefore, according to this configuration, the pulse energy and the pulse time width can fall within the respective target ranges. Here, when the pulse time width falls within the target range of the pulse time width in step SP13 or when the current value of the current supplied to the first laser light source 131 is adjusted in step SP14, the processor 121 may terminate the control flow.

Further, in the EUV light generation apparatus 100 of the present embodiment, the laser oscillator 135 is also cooled. According to this configuration, as compared with the case in which the laser oscillator 135 is not cooled, a change in the wavelength of the first excitation light in the laser oscillator 135 can be suppressed, and deviation of the pulse energy from the target range can be further suppressed. Although the cooling medium cools the laser oscillator 135, the pipe 137a may not extend to the laser oscillator 135, and the cooling medium may not cool the laser oscillator 135.

The first beam splitter 401 and the second beam splitter 421 may be arranged at opposite positions to each other, and the arrangement order thereof is not particularly limited.

5. Description of Extreme Ultraviolet Light Generation Apparatus of Second Embodiment Next, the configuration of the EUV light generation apparatus 100 of a second embodiment will be described. Any component same as that described above is denoted by an identical reference sign, and duplicate description thereof is omitted unless specific description is needed.

5.1 Configuration

Figure 8:
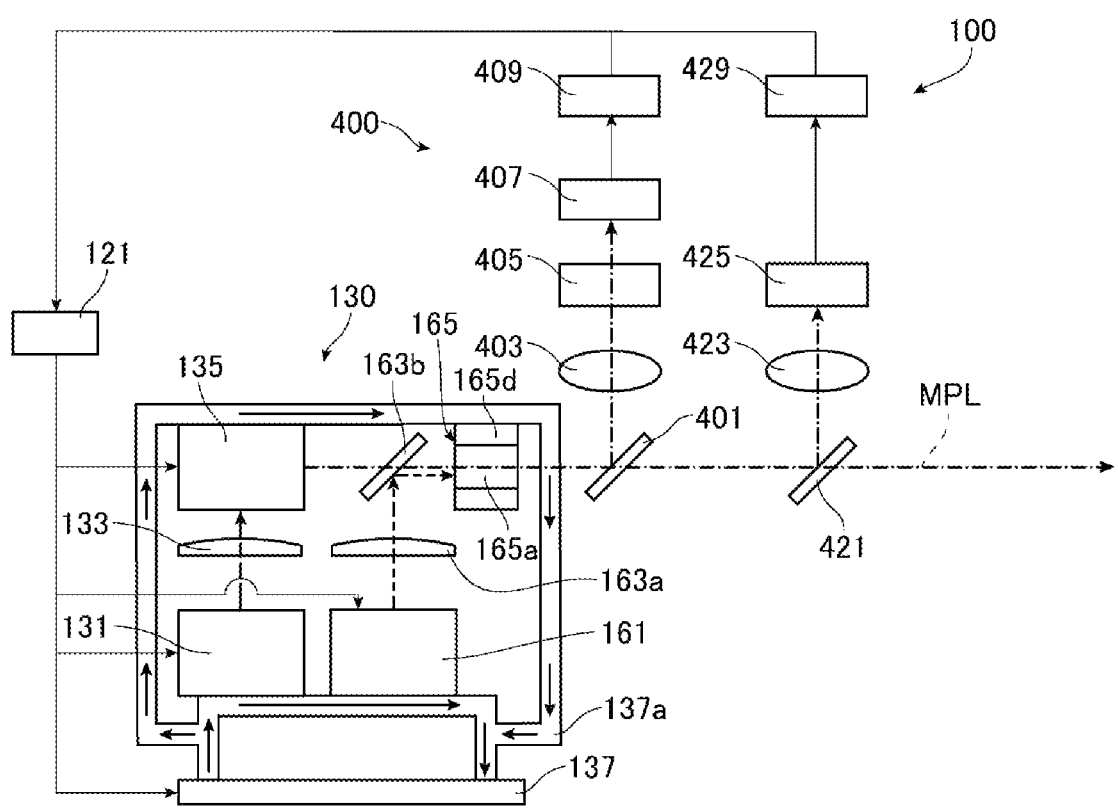
FIG. 8 is a schematic view showing a schematic configuration example of a part of the extreme ultraviolet light generation apparatus of a second embodiment.

FIG. 8 is a schematic view showing a schematic configuration example of a part of the EUV light generation apparatus 100 of the present embodiment. The EUV light generation apparatus 100 of the present embodiment differs from the EUV light generation apparatus 100 of the first embodiment in that the main pulse laser device 130 further includes a second laser light source 161, a second lens 163a, a dichroic mirror 163b, and an amplifier 165, and the pipe 137a extends to the second laser light source 161 and the amplifier 165 so that the cooling medium also cools them.

Similarly to the first laser light source 131, the second laser light source 161 may be, for example, a laser diode bar. Hereinafter, the excitation light output from the second laser light source 161 will be described as the second excitation light. In FIG. 8, respective beams of the second excitation light of a plurality of laser diodes in the laser diode bar are collectively shown by one arrow of a broken line. The second laser light source 161 is controlled by the processor 121 via the delay circuit 122. The second excitation light has a wavelength of, for example, about 808 nm.

The second lens 163a is a cylindrical convex lens arranged between the second laser light source 161 and the dichroic mirror 163b. The convex surface of the second lens 163a faces the dichroic mirror 163b, and the second lens 163a concentrates the second excitation light from the second laser light source 161 on the dichroic mirror 163b. The dichroic mirror 163b transmits the main pulse laser light MPL from the laser oscillator 135 and reflects the second excitation light from the second laser light source 161. Then, each of the main pulse laser light MPL and the second excitation light travels to the amplifier 165.

The amplifier 165 of the present embodiment includes a laser crystal 165a. The laser crystal 165a is a cylindrical member and is held inside by a cylindrical holder 165d. The laser crystal 165a is doped with the same active medium as the laser crystal 135a. The active medium is excited by the second excitation light from the second laser light source 161. In this state, the main pulse laser light MPL is amplified by stimulated emission when the main pulse laser light MPL from the laser oscillator 135 enters the laser crystal 165a. In this way, the amplifier 165 amplifies, with the second excitation light, the main pulse laser light MPL output from the laser oscillator 135. The amplified main pulse laser light MPL travels to the first beam splitter 401.

A part of the pipe 137a of the present embodiment extends from the first laser light source 131 to the temperature regulator 137 via the second laser light source 161 so that the cooling medium circulates through the temperature regulator 137, the first laser light source 131, and the second laser light source 161. A substrate on which a plurality of laser diodes in the second laser light source 161 are arranged is arranged on the pipe 137a, and the cooling medium cools the second laser light source 161 through the pipe 137a and the substrate.

Another part of the pipe 137a extends from the laser oscillator 135 to the amplifier 165, is connected to the amplifier 165, and joins a portion of the pipe 137a where the cooling medium returns from the second laser light source 161 to the temperature regulator 137. In this manner, the other part of the pipe 137a is connected to each of the temperature regulator 137, the laser oscillator 135, and the amplifier 165 such that the cooling medium circulates through the temperature regulator 137, the laser oscillator 135, and the amplifier 165. At the connection between the pipe 137a and the amplifier 165, a holder 165d is arranged on the pipe 137a. The cooling medium cools the laser crystal 165a through the pipe 137a and the holder 165d.

A part of the cooling medium flowing from the temperature regulator 137 flows to the second laser light source 161 via the first laser light source 131 to cool each of them. Another part of the cooling medium flows to the amplifier 165 via the laser oscillator 135 to cool each of them. After cooling, the cooling medium returns to the temperature regulator 137 through the pipe 137a, and after the temperature is regulated again by the temperature regulator 137, the cooling medium flows as described above, and cools each of them. The arrangement position of the pipe 137a and the circulation direction of the cooling medium are not particularly limited.

The measurement instrument 400 of the present embodiment is arranged on the downstream side of the amplifier 165 with respect to the travel direction of the main pulse laser light MPL output from the laser oscillator 135, and measures the pulse energy and the pulse time width of the main pulse laser light MPL output from the amplifier 165.

5.2 Operation

Next, operation of the processor 121 of the present embodiment will be described. The control flowchart of the present embodiment is similar to the control flowchart of the first embodiment shown in FIG. 7. However, in the operation of the present embodiment, the start state is partly different from the start state of the first embodiment. Specifically, at the start of the present embodiment, the main pulse laser light MPL from the laser oscillator 135 is amplified by the amplifier 165. Then, a part of the amplified main pulse laser light MPL is reflected by each of the beam splitters 401, 421, and the pulse energy and the pulse time width are measured by the measurement instrument 400. The cooling medium flows through the pipe 137a to cool the first laser light source 131, the laser oscillator 135, the second laser light source 161, and the amplifier 165. The start state other than the above is similar to the start state of the first embodiment.

Further, the pulse energy in step SP11 of the present embodiment is the pulse energy of the main pulse laser light MPL output from the amplifier 165 and measured by the measurement instrument 400. Further, in step SP12 of the present embodiment, the processor 121 controls the temperature regulator 137 that adjusts the temperature of the cooling medium so that the pulse energy measured by the measurement instrument 400 falls within the target range of the pulse energy. The cooling medium flows through the pipe 137a and travels to the first laser light source 131, the laser oscillator 135, the second laser light source 161, and the amplifier 165 to cool them. When the cooling medium cools them, the cooling medium flows through the pipe 137a and returns to the temperature regulator 137, and the temperature is adjusted again at the temperature regulator 137. The pulse time width in step SP13 is the pulse time width of the main pulse laser light MPL output from the amplifier 165 and measured by the measurement instrument 400.

5.3 Effect

The cooling medium of the present embodiment also cools the second laser light source 161. According to this configuration, a change in the wavelength of the second excitation light can be suppressed as compared with a case in which the second laser light source 161 is not cooled. Thus, the pulse energy of the main pulse laser light MPL amplified by the amplifier 165 with the second excitation light whose wavelength change is suppressed may fall within the target range. Although the cooling medium cools the second laser light source 161 in the present embodiment, the pipe 137a may not extend to the second laser light source 161 and the cooling medium may not cool the second laser light source 161.

The measurement instrument 400 of the present embodiment measures the pulse energy and the pulse time width of the main pulse laser light MPL output from the amplifier 165. According to this configuration, the pulse energy and the pulse time width of the main pulse laser light MPL at the time of irradiating the droplet target DL can be easily set within the respective target ranges compared to a case in which the measurement instrument 400 is arranged between the laser oscillator 135 and the amplifier 165 and the pulse energy and the pulse time width of the main pulse laser light MPL before entering the amplifier 165 are measured. Therefore, a decrease in the generation efficiency of the plasma can be suppressed, and the EUV light 101 that satisfies the performance required by the exposure apparatus 200 or the inspection apparatus 300 can be output. Here, the measurement instrument 400 may be arranged between the laser oscillator 135 and the amplifier 165, and the pulse energy and the pulse time width of the main pulse laser light MPL output from the laser oscillator 135 and before being amplified by the amplifier 165 may be measured.

In the measurement instrument 400 of the present embodiment, the cooling medium also cools the amplifier 165. According to this configuration, the change in the wavelengths of the second excitation light and the main pulse laser light MPL in the amplifier 165 can be suppressed, and the pulse energy may fall within the target range as compared with the case in which the amplifier 165 is not cooled. Here, in the present embodiment, the cooling medium cools the amplifier 165, but the pipe 137a may not extend to the amplifier 165, and the cooling medium may not cool the amplifier 165.

Also in the present embodiment, the cooling medium may not cool the laser oscillator 135 as described in the first embodiment.

6. Description of Extreme Ultraviolet Light Generation Apparatus of Third Embodiment Next, the configuration of the EUV light generation apparatus 100 of a third embodiment will be described. Any component same as that described above is denoted by an identical reference sign, and duplicate description thereof is omitted unless specific description is needed.

6.1 Configuration

Figure 9:
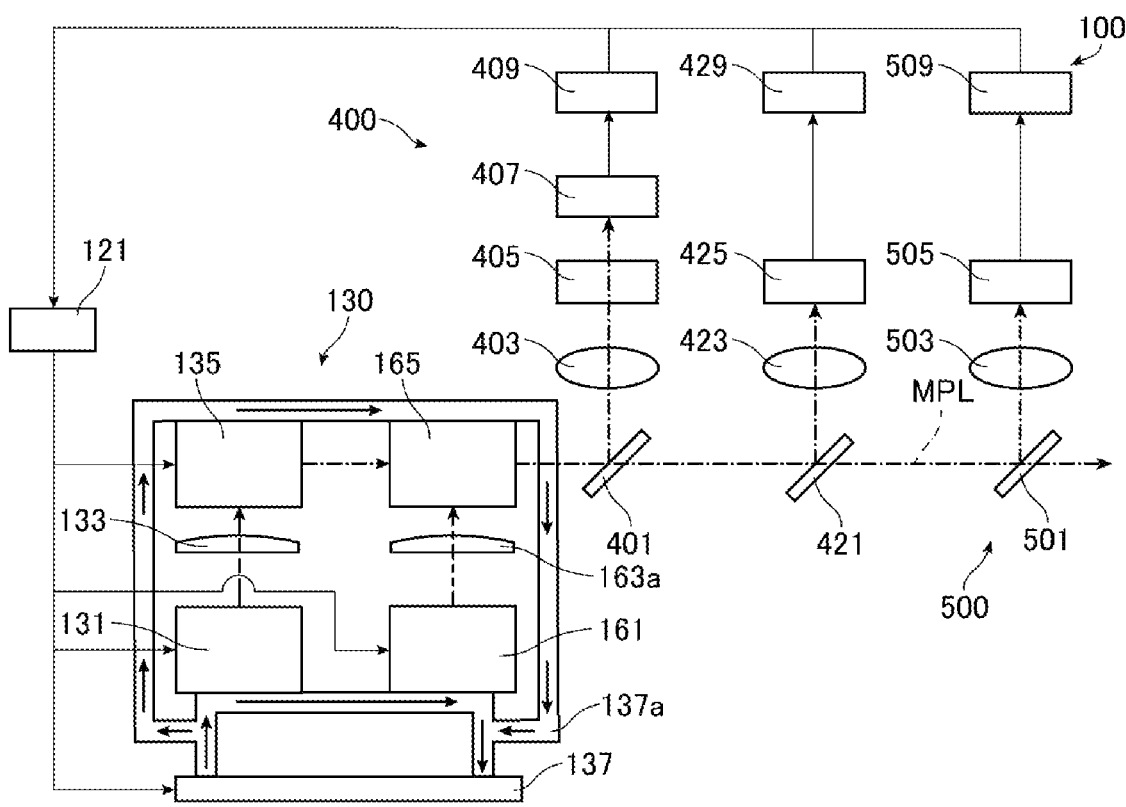
FIG. 9 is a schematic view showing a schematic configuration example of a part of the extreme ultraviolet light generation apparatus of a third embodiment.

FIG. 9 is a schematic view showing a schematic configuration example of a part of the EUV light generation apparatus 100 of the present embodiment. In the EUV light generation apparatus 100 of the present embodiment, a monitor 500 is further arranged. The monitor 500 will be described later.

Figure 10:
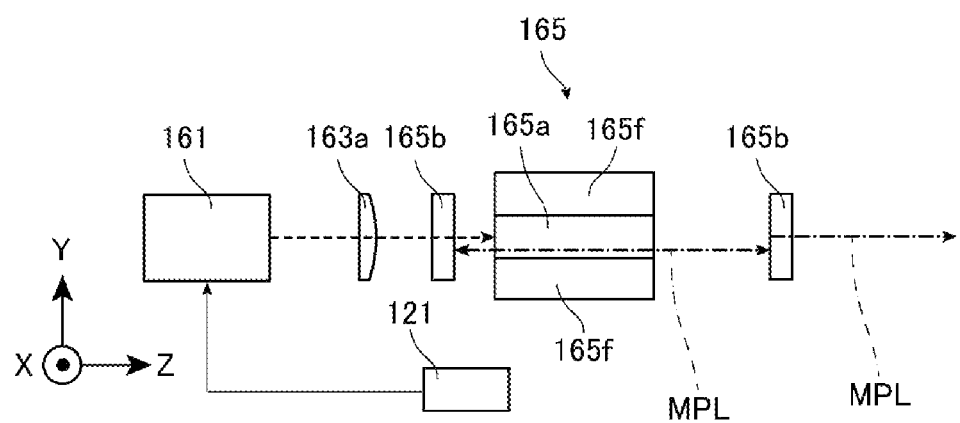
FIG. 10 is a diagram of an amplifier of the third embodiment viewed from the X direction.
Figure 11:
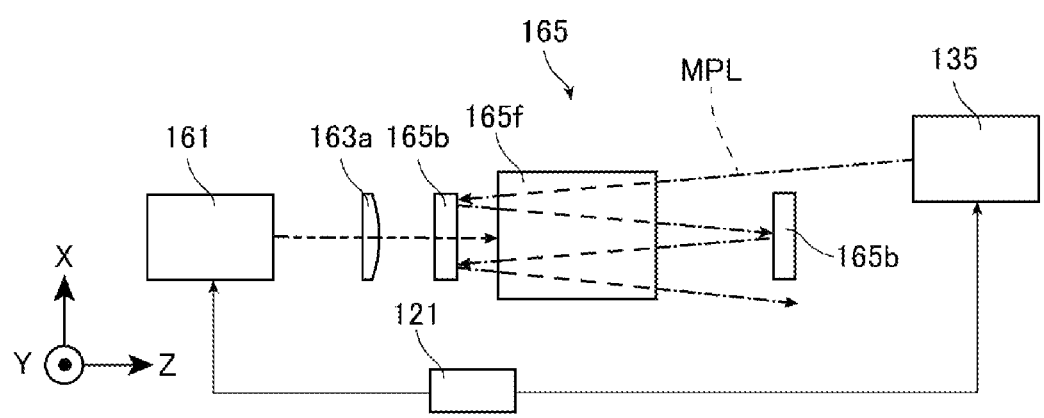
FIG. 11 is a diagram of the amplifier of the third embodiment viewed from the Y direction.

FIG. 10 is a diagram of the amplifier 165 of the present embodiment viewed from the X direction. FIG. 11 is a diagram of the amplifier 165 of the present embodiment viewed from the Y direction. The present embodiment is different from the second embodiment in that the amplifier 165 is a slab-type amplifier. As shown in FIGS. 10 and 11, the amplifier 165 of the present embodiment includes a second lens 163a, a laser crystal 165a, and resonator mirrors 165b. The second lens 163a of the present embodiment is arranged between the second laser light source 161 and the laser crystal 165a. The laser crystal 165a of the present embodiment is a flat plate-shaped member, and is sandwiched between a pair of substrates 165f. The main surface of the laser crystal 165a lies in the XZ plane. The resonator mirrors 165b are configured of a pair of concave mirrors. Hereinafter, the pair of concave mirrors, one concave mirror of the pair of concave mirrors, and the other concave mirror thereof may be simply referred to as a pair of mirrors, one mirror, and the other mirror. The laser crystal 165a is arranged between the pair of mirrors, and a concave surface of each of the resonator mirrors 165b faces the laser crystal 165a. Further, one mirror of the resonator mirrors 165b is arranged between the second lens 163a and the laser crystal 165a, and the other mirror of the resonator mirrors 165b is arranged between the laser crystal 165a and the first beam splitter 401. The second excitation light from the second laser light source 161 is concentrated on the laser crystal 165a by the second lens 163a. At this time, the second excitation light passes through the one mirror of the resonator mirrors 165b. The laser crystal 165a absorbs and excites the second excitation light. The laser oscillator 135 of the present embodiment is arranged on a side across the other mirror of the resonator mirrors 165b from the second laser light source 161 and the main pulse laser light MPL from the laser oscillator 135 passes by the other mirror and enters the laser crystal 165a. The main pulse laser light MPL is amplified by stimulated emission when passing through the excited laser crystal 165a. Then, the main pulse laser light MPL travels in a zigzag manner between the resonator mirrors 165b and is further amplified by passing through the laser crystal 165a while traveling. The amplified main pulse laser light MPL passes by the other mirror of the resonator mirrors 165b and travels toward the first beam splitter 401. In FIGS. 9 and 10, the travel direction of the second excitation light and the main pulse laser light MPL from each of the laser oscillator 135 and the amplifier 165 are shown differently from each other for ease of viewing. In particular, FIG. 9 simply shows the travel directions of the second excitation light and the main pulse laser light MPL from each of the laser oscillator 135 and the amplifier 165, and does not show the actual travel paths thereof.

When the amplifier 165 is a slab-type amplifier, the divergence angle of the main pulse laser light MPL output from the amplifier 165 may deviate from an expected value when the thermal lens condition in the laser crystal 165a changes. As a result, the spot shape of the main pulse laser light MPL at the time of irradiating the droplet target DL may be deformed from the target shape to an unintended shape. For example, the target shape is a circular shape and the unintended shape is an elliptical shape. Therefore, in the present embodiment, the divergence angle is monitored by the monitor 500, the divergence angle is adjusted by adjusting the current value of the current of the second laser light source 161, and the spot shape is maintained in the target shape.

As shown in FIG. 9, the monitor 500 includes a third beam splitter 501, a third light concentrating lens 503, a camera 505, and a measurement circuit 509.

The third beam splitter 501 is arranged on the optical path of the main pulse laser light MPL from the other mirror of the resonator mirrors 165b of the amplifier 165 to the plasma generation region AR, and is preferably arranged between the other mirror and the mirror 31. The third beam splitter 501 of the present embodiment is arranged between the second beam splitter 421 and the mirror 31 with respect to the travel direction of the main pulse laser light MPL output from the laser oscillator 135. The third beam splitter 501 transmits a part of the main pulse laser light MPL transmitted through the second beam splitter 421 toward the plasma generation region AR, and reflects another part of the main pulse laser light MPL toward the third light concentrating lens 503. The third light concentrating lens 503 concentrates the main pulse laser light MPL reflected by the third beam splitter 501 onto the detection surface of the camera 505. The camera 505 acquires image data of the main pulse laser light MPL concentrated on the detection surface by the third light concentrating lens 503, and outputs a signal related to the image data to the measurement circuit 509. The measurement circuit 509 measures the divergence angle of the main pulse laser light MPL output from the amplifier 165 based on the image data and the distance from the other mirror of the resonator mirrors 165b of the amplifier 165 to the detection surface. The measurement circuit 509 is connected to the processor 121 and outputs a signal related to the measured divergence angle of the main pulse laser light MPL to the processor 121.

6.2 Operation

Next, operation of the processor 121 of the present embodiment will be described.

Figure 12:
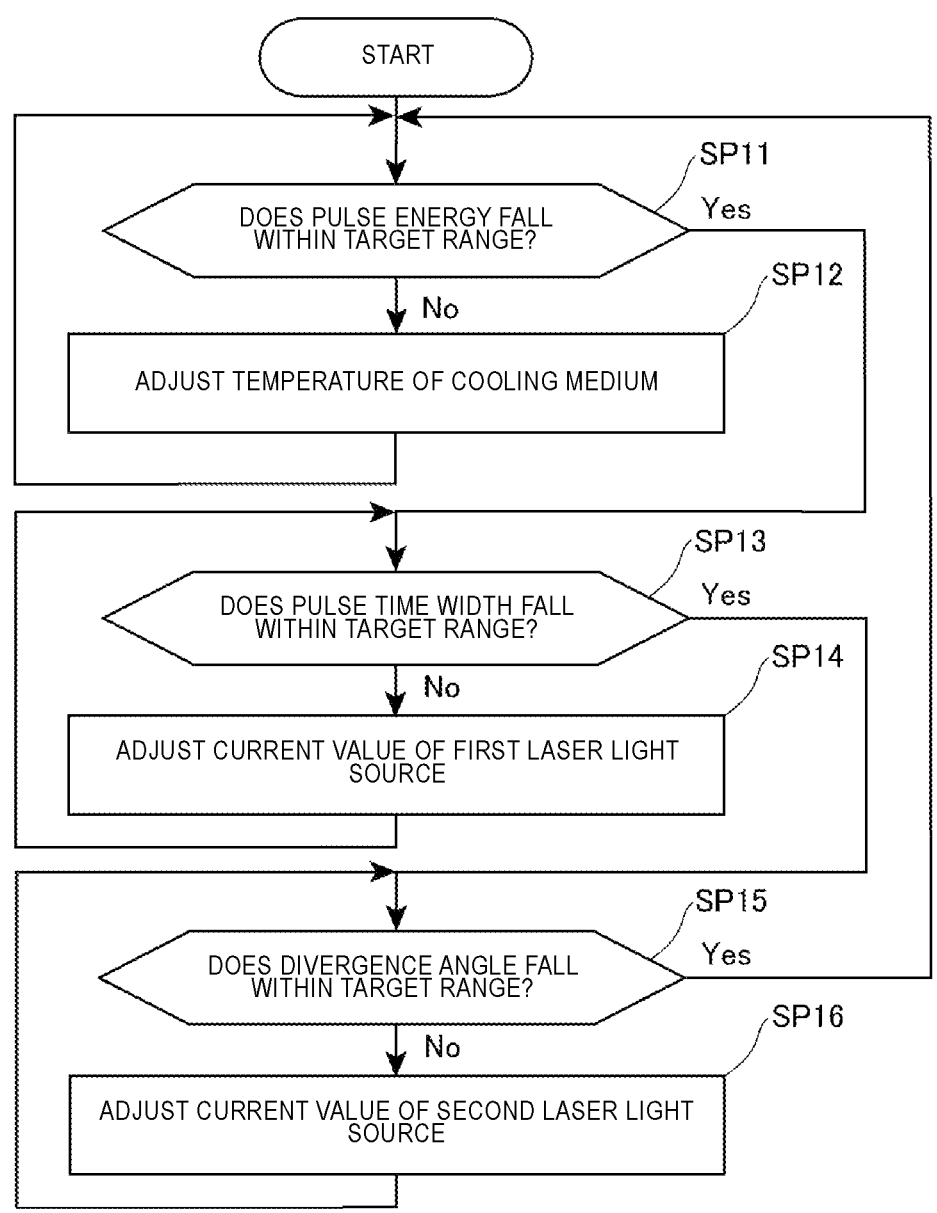
FIG. 12 is a diagram illustrating a control flowchart of the processor according to the third embodiment.

FIG. 12 is a diagram showing a control flowchart of the processor 121 of the present embodiment. The control flowchart of the present embodiment further includes steps SP15 and SP16. The start state shown in FIG. 12 is different from the second embodiment in that a part of the main pulse laser light MPL output from the amplifier 165 is reflected by the third beam splitter 501, the divergence angle of the main pulse laser light MPL is measured by the monitor 500, and a signal related to the divergence angle is input to the processor 121.

In step SP13, when the pulse time width measured by the measurement instrument 400 does not fall within the target range of the pulse time width, the processor 121 advances the control flow to step SP14. Further, when the measured pulse time width falls within the target range, the processor 121 advances the control flow to step SP15.

(Step SP15)

In the present step, when the divergence angle measured by the monitor 500 falls within the target range of the divergence angle, the processor 121 returns the control flow to step SP11. Further, when the measured divergence angle does not fall within the target range, the processor 121 advances the control flow to step SP16.

(Step SP16)

In the present step, the processor 121 adjusts the current value of the current supplied to the second laser light source 161 so that the divergence angle measured by the monitor 500 falls within the target range of the divergence angle. In step SP12, the temperature of the cooling medium is adjusted. At this time, the cooling medium also cools the second laser light source 161, and when the second laser light source 161 is also cooled at this temperature, the divergence angle of the main pulse laser light MPL may not fall within the target range. Therefore, in the present step, the processor 121 adjusts the current value so that the divergence angle falls within the target range of the divergence angle. As a result, the spot shape of the main pulse laser light MPL at the time of irradiating the droplet target DL may be suppressed from changing from the target shape to an unintended shape.

After adjusting the current value, the processor 121 returns the control flow to step SP15.

6.3 Effect

The amplifier 165 of the present embodiment is a slab-type amplifier 165. Further, the processor 121 adjusts the current value of the current supplied to the second laser light source 161 so that the divergence angle of the main pulse laser light MPL measured by the monitor 500 falls within the target range of the divergence angle of the main pulse laser light MPL.

According to this configuration, the spot shape of the main pulse laser light MPL at the time of irradiating the droplet target DL may be suppressed from changing from the target shape to an unintended shape. As a result, a loss in the main pulse laser light MPL owing to that a part of the main pulse laser light MPL is not radiated to the diffusion target can be suppressed, and a decrease in the generation efficiency of the plasma can be suppressed.

In the present embodiment, the processor 121 may adjust the current value of the current supplied to the second laser light source 161 in the step SP16 and end the control flow.

In the present embodiment, the arrangement order of the first beam splitter 401, the second beam splitter 421, and the third beam splitter 501 is not particularly limited.

The description above is intended to be illustrative and the present disclosure is not limited thereto. Therefore, it would be obvious to those skilled in the art that various modifications to the embodiments of the present disclosure would be possible without departing from the spirit and the scope of the appended claims. Further, it would be also obvious to those skilled in the art that embodiments of the present disclosure would be appropriately combined.

The terms used throughout the present specification and the appended claims should be interpreted as non-limiting terms unless clearly described. For example, terms such as "comprise", "include", "have", and "contain" should not be interpreted to be exclusive of other structural elements. Further, indefinite articles "a/an" described in the present specification and the appended claims should be interpreted to mean "at least one" or "one or more." Further, "at least one of A, B, and C" should be interpreted to mean any of A, B, C, A+B, A+C, B+C, and A+B+C as well as to include combinations of the any thereof and any other than A, B, and C.

What is claimed is:

1. An extreme ultraviolet light generation apparatus configured to generate extreme ultraviolet light by irradiating a droplet target with laser light, comprising:
   a first light source configured to output first excitation light;
   a laser oscillator including an active medium and configured to perform laser oscillation by irradiating the active medium with the first excitation light to output the laser light;
   a measurement instrument configured to measure a pulse energy and a pulse time width of the laser light;
   a temperature regulator that adjusts a temperature of a cooling medium that cools the first light source; and
   a processor,
   the processor being configured to control the temperature regulator to adjust the temperature of the cooling medium so that the pulse energy measured by the measurement instrument falls within a target range of the pulse energy, and adjust a current value of a current supplied to the first light source so that the pulse time width measured by the measurement instrument falls within a target range of the pulse time width.

2. The extreme ultraviolet light generation apparatus according to claim 1,
wherein the processor controls the temperature regulator to lower the temperature of the cooling medium when the pulse energy measured by the measurement instrument is smaller than the target range of the pulse energy.

3. The extreme ultraviolet light generation apparatus according to claim 1,
wherein the processor decreases the current value when the pulse time width measured by the measurement instrument is smaller than the target range of the pulse time width, and increases the current value when the pulse time width is larger than the target range of the pulse time width.

4. The extreme ultraviolet light generation apparatus according to claim 1,
wherein the processor adjusts the current value after controlling the temperature regulator which adjusts the temperature of the cooling medium.

5. The extreme ultraviolet light generation apparatus according to claim 4,
wherein the processor controls again the temperature regulator which adjusts the temperature of the cooling medium after adjusting the current value.

6. The extreme ultraviolet light generation apparatus according to claim 1,
wherein the cooling medium also cools the laser oscillator.

7. The extreme ultraviolet light generation apparatus according to claim 1, further comprising:
a second light source configured to output second excitation light; and
an amplifier which amplifies, with the second excitation light, the laser light output from the laser oscillator,
wherein the cooling medium also cools the second light source.

8. The extreme ultraviolet light generation apparatus according to claim 7,
wherein the measurement instrument measures the pulse energy and the pulse time width of the laser light output from the amplifier.

9. The extreme ultraviolet light generation apparatus according to claim 7,
wherein the amplifier is a slab-type amplifier.

10. The extreme ultraviolet light generation apparatus according to claim 9, further comprising a monitor configured to measure a divergence angle of the laser light output from the amplifier,
wherein the processor adjusts a current value of a current supplied to the second light source so that the divergence angle of the laser light measured by the monitor falls within a target range of the divergence angle of the laser light.

11. The extreme ultraviolet light generation apparatus according to claim 7,
wherein the cooling medium also cools the amplifier.

12. The extreme ultraviolet light generation apparatus according to claim 1,
wherein the cooling medium is water.

* * * * *